United States Patent [19]

Komurasaki et al.

[11] Patent Number: 4,739,244
[45] Date of Patent: Apr. 19, 1988

[54] VEHICLE GENERATOR WITH ACCELERATION CONTROL OVERRIDE

[75] Inventors: Keiichi Komurasaki; Shiro Iwatani, both of Himeji, Japan

[73] Assignee: Mitsubishi Denki Kabushiki Kaisha, Tokyo, Japan

[21] Appl. No.: 929,312

[22] Filed: Nov. 12, 1986

[30] Foreign Application Priority Data

Nov. 18, 1985 [JP] Japan .............................. 60-177796[U]

[51] Int. Cl.⁴ ............................................... H02J 7/14
[52] U.S. Cl. ......................................... 322/29; 320/64
[58] Field of Search ........................ 322/28, 29, 32, 99; 320/64

[56] References Cited

U.S. PATENT DOCUMENTS

| | | | |
|---|---|---|---|
| 4,368,417 | 1/1983 | Matsuyama | 322/29 |
| 4,629,968 | 12/1986 | Butts et al. | 322/29 |
| 4,651,081 | 3/1987 | Nishimura et al. | 322/29 X |
| 4,659,977 | 4/1987 | Kissel et al. | 320/64 |

Primary Examiner—R. J. Hickey
Attorney, Agent, or Firm—Sughrue, Mion, Zinn, Macpeak and Seas

[57] ABSTRACT

A control device for a vehicle generator includes an acceleration detector (9) whose output disables the generator during periods of acceleration to attendantly reduce the engine load. A phase voltage regulator (11) responds to a voltage at one phase (P) of an armature winding of the generator to override the acceleration detector output and increase the generator voltage to a limited, detection level when such voltage is reduced below a predetermined level.

3 Claims, 3 Drawing Sheets

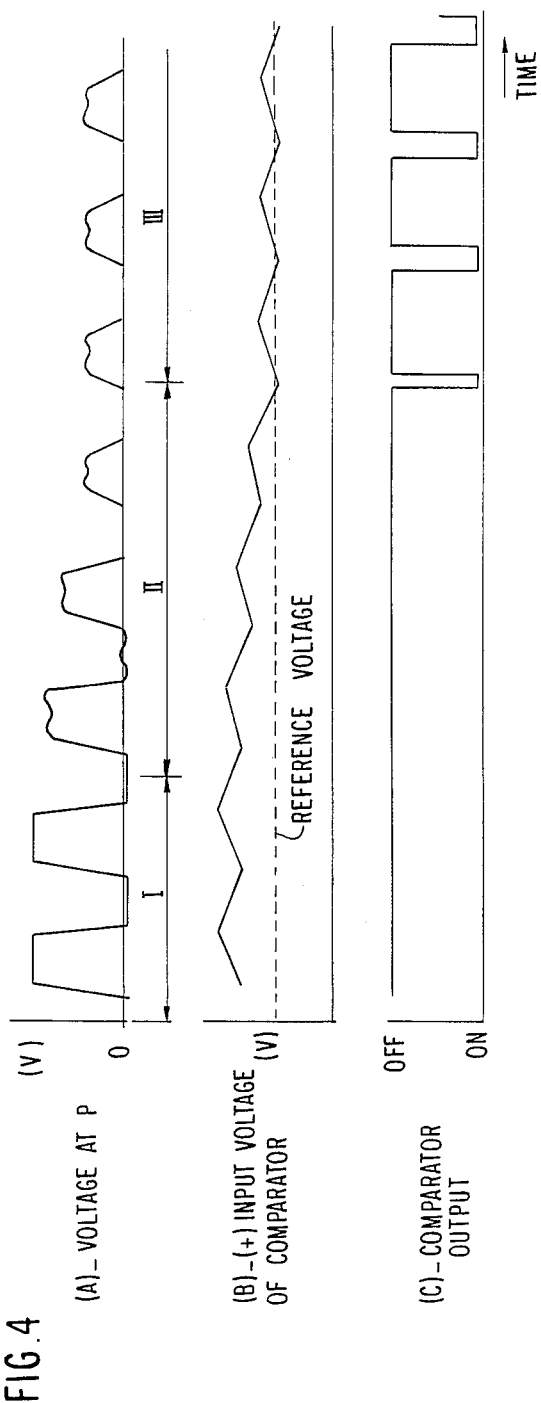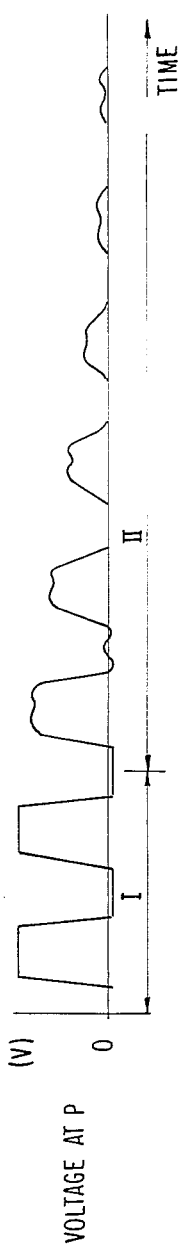

VEHICLE GENERATOR WITH ACCELERATION CONTROL OVERRIDE

BACKGROUND OF THE INVENTION

This invention relates to a control device for a vehicle mounted a.c. generator, and particularly to such a device by which a peak value of a phase voltage of an armature winding of the generator is regulated when the generator is inoperative.

FIG. 1 is a circuit diagram of a conventional control device of this type, in which a generator 1 driven by an engine of the vehicle includes an armature winding 101 and a field winding 102. The letter P depicts an output terminal of one of the three phases of the armature winding 101, from which a phase voltage produced in the phase is derived. A rectifier 2 functions to fullwave-rectify the a.c. output voltage of the generator 1 and has output terminals 201, 202, and 203. The main output of the generator is derived from terminal 201. The voltage at terminal 202 is used to energize the field winding 102, and is applied to a voltage regulator 3. Terminal 203 is grounded.

The voltage regulator 3 serves to regulate the output voltage of the generator 1 to a predetermined value, and includes a voltage divider composed of a pair of series connected resistors 301 and 302 connected between terminal 202 and ground. The junction between the resistors 301 and 302 is connected through a Zener diode 303 to the base of a transistor 304.

The Zener diode 303 is turned on when the output voltage at terminal 202 exceeds a predetermined value set by the resistors 301 and 302 and by the Zender diode 303, and is turned off when the output voltage of the generator falls below the predetermined value.

The transistor 304 is turned on when the Zener diode 303 is turned on, and vice versa. A transistor 308 is connected in parallel to the transistor 304, and the emitters of these transistors are grounded. Their collectors are connected to the base of an output transistor 305.

The base of transistor 305 and a collector thereof are connected through a base resistor 306 and a diode 307 to the output terminal 202, respectively. The collector of transistor 305 is further connected through the field winding 102 to the output terminal 202. That is, the diode 307 is connected in parallel to the field winding 102 to absorb surges produced due to the on-off operation of the field winding.

An electrical load 5 of the vehicle is connected in parallel to a battery 4. The negative terminal of the battery is grounded and its positive terminal is connected to the output terminal 201.

The positive terminal of the battery 4 is connected through a series circuit including a key switch 6, an initial energizing resistor 7 and a reverse current blocking diode 8 to the output terminal 202.

An acceleration detector 9 is supplied with the phase voltage at point P of the armature winding 101 of the generator 1 to detect the rotational speed of the generator. The acceleration detector 9 is further supplied with signals from various sensors mounted on the vehicle to detect whether or not the vehicle is being accelerated. When the vehicle is being accelerated, the acceleration detector 9 produces an acceleration signal corresponding to the rotational speed of the generator and supplies it to other control devices of the vehicle.

The acceleration detector 9 comprises a transistor 901 which is normally in an on state, and is turned off when the vehicle is accelerated. The output of the acceleration detector 9 is supplied to the voltage regulator 3. The transistor 901 has a collector connected to the base of transistor 308 and, through a resistor 309, to the output terminal 202.

FIG. 2 shows a waveform of the phase voltage at point P of the generator 1 under control of the conventional control device.

In operation, when the key switch 6 is closed to start the engine, an initial energizing current is supplied from the battery 4 through the switch 6, the resistor 7 and the diode 8 to the field winding 102 of the generator 1 to enable the latter to operate. When the engine starts, the generator 1 commences its operation. The voltage regulator 3 is supplied with a voltage generated by the generator 1 from the output terminal 202 of the rectifier 2 and, when the supplied voltage exceeds a predetermined voltage, the Zener diode 303 and the output transistor 305 are turned on and off, respectively, to thereby cut off the field winding 102. On the other hand, when the supplied voltage is below the predetermined value, the Zener diode 303 and the transistor 305 are turned off and on, respectively, to allow a field current to flow through the field winding 102.

By repeating these operations, the output voltage of the generator 1 is regulated to the predetermined level by the voltage regulator 3.

The acceleration detector 9 is supplied with the phase voltage at terminal P of the generator in the form of a pulse train, a peak value of which is substantially equal to the predetermined level set by the voltage regulator 3 and a frequency of which corresponds to the rotational speed of the generator, as shown in region I in FIG. 2. When an acceleration of the vehicle is detected on the basis of the input signal from the sensors of the vehicle, the acceleration detector 9 provides an acceleration signal corresponding to the number of revolutions of the generator, which is supplied to the other control devices of the vehicle and upon which the transistor 901 is turned off to turn on the transistor 308 of the voltage regulator 3, so that the output transistor 305 is turned off regardless of the operation of the Zener diode 303, to cut off the current to the field winding 102 and thereby stop the power generation of the generator.

As described, when the acceleration detector 9 detects the acceleration of the vehicle, the generator 1 stops generating power and the drive torque required to drive the generator is removed from the mechanical load of the engine. Therefore, the acceleration performance of the engine is improved.

In such a conventional control device, however, when the generator ceases operation upon the detection of vehicle acceleration, the peak value of the phase voltage at point P is gradually lowered as shown in region II in FIG. 2 and, when the value becomes very small, the acceleration detector 9 can no longer supply an appropriate control signal to the vehicle control device.

SUMMARY OF THE INVENTION

An object of the invention is thus to provide a control device capable of detecting the number of revolutions of the generator even when an acceleration is being detected so that the phase voltage of the generator can be controlled.

This object is achieved by providing a phase voltage regulator which regulates the phase voltage even when acceleration is being detected.

The phase voltage regulator detects the phase voltage of one of the phases of the generator, and regulates it to a predetermined value by supplying a field current to the generator when the detected phase voltage falls below the predetermined value.

BRIEF DESCRIPTION OF THE DRAWINGS

FIG. 2 is a waveform of a phase voltage generated at a point P of an armature winding portion of the generator shown in FIG. 1;

FIG. 4 shows voltage waveforms at various points of the embodiment in FIG. 3.

DETAILED DESCRIPTION OF THE PREFERRED EMBODIMENT

Figure 1:
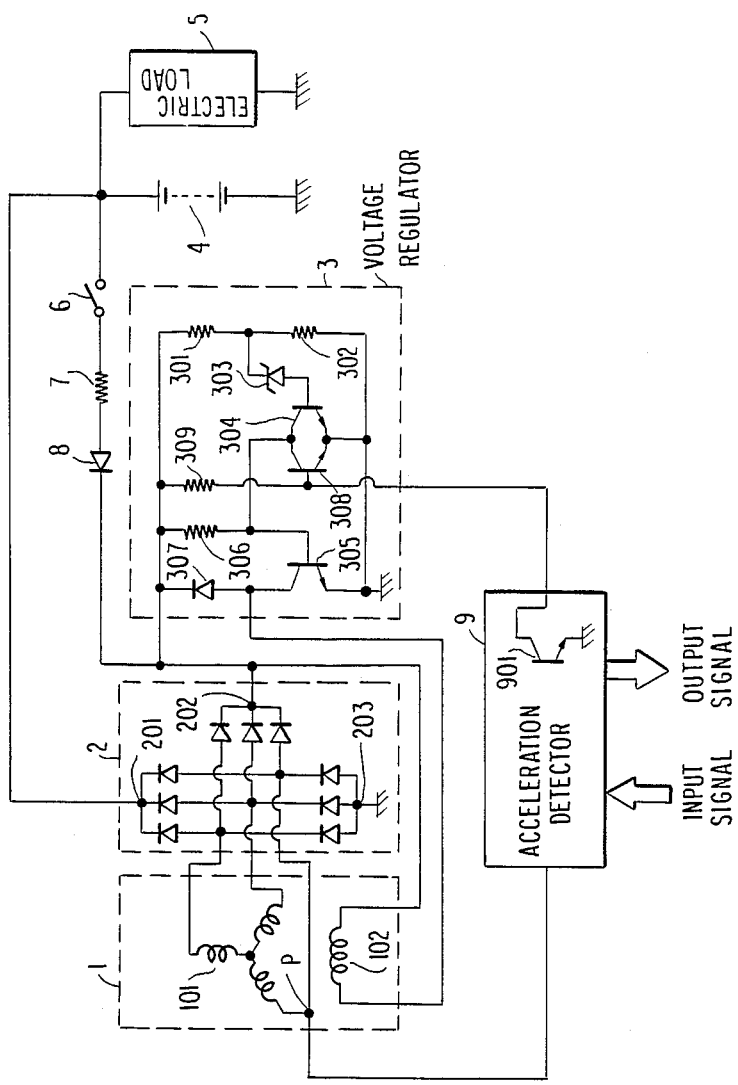
FIG. 1 is a circuit diagram of a vehicle mounted generator system including a conventional acceleration detector.
Figure 3:
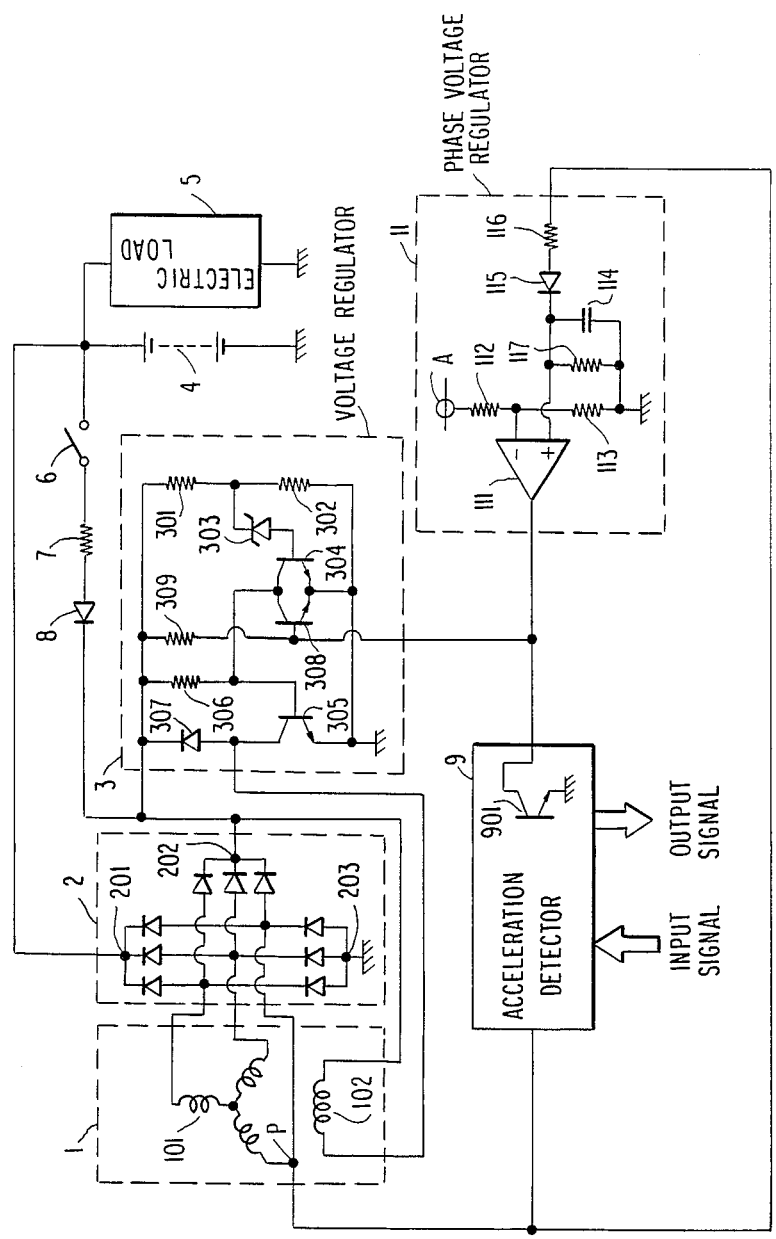
FIG. 3 is a circuit diagram of an embodiment of the invention.

An embodiment of the invention shown in FIG. 3 is substantially the same in construction and operation as the conventional control device shown in FIG. 1, except that the invention also includes a phase voltage regulator 11. To avoid redundancy only the phase voltage regulator 11 and some circuit portions which are operatively associated with it will be described.

In FIG. 3, the phase voltage regulator 11 comprises a constant voltage source A, a comparator 111 having an inverted input and a non-inverted input, a voltage divider composed of a pair of resistors 112 and 113 connected in series between the constant voltage source A and ground, a junction between the resistors being connected to the inverted input of the comparator 111 to apply a reference voltage thereto, a parallel circuit of a capacitor 114 and a resistor 117 connected between the noninverted input of the comparator 111 and ground, a reverse current blocking diode 115, and a resistor 116 connected in series with the diode 115. The input end of the resistor 116 is connected to point P, and the output of the comparator 111 is connected to the collector of output transistor 901 in the acceleration detector 9, which is identical to that shown in FIG. 1.

The resistor 116 forms a charging circuit for the capacitor 114 so that the latter is charged when the voltage at point P increases. The resistor 117 forms a discharge circuit for the capacitor 114 so that the latter discharges when the phase voltage at point P decreases.

FIG. 4 shows waveforms of voltages at various points of the circuit shown in FIG. 3, in which waveforms A, B and C are the voltages at a point P of the generator, at the non-inverted input of the comparator 111, i.e., a charge-discharge waveform of the comparator, and at the output of the comparator 111, respectively. The dotted line in waveform B is the reference voltage provided by the constant voltage source A and the voltage divider composed of the series resistors 112 and 113.

In the operation of the circuit in FIG. 3, the voltage regulator 3 operates normally to regulate the rectified generator output voltage when the acceleration detector 9 does not detect any engine acceleration, during which time the phase voltage at point P in the form of a pulse train has a peak value substantially equal to a predetermined value preset by the voltage regulator 3 and a frequency proportional to the number of revolutions of the engine as shown by waveform A in region I of FIG. 4. The potential at the non-inverted input of the comparator 11 remains higher than the reference voltage due to the charge-discharge characteristics of the capacitor 114, as shown by waveform B. Therefore, the output potential of the comparator 111 is at an "H" level, i.e., in an off level, as shown by waveform C, which does not affect the voltage regulator 3.

When the acceleration detector 9 detects an acceleration of the engine, the transistor 901 is turned off and the generator 1 stops its operation. Therefore, the peak value of the phase voltage at point P decreases gradually as shown by waveform A in region II, and the charge on the capacitor 114 decreases correspondingly. As a result, the potential at the non-inverted input of the comparator 111 decreases gradually to a level below the reference voltage, as shown by waveform B, to switch the output of the comparator to an "L" level as shown by waveform C.

When the output of the comparator 111 is switched to the "L" level, the transistor 308 of the voltage regulator 3 is turned off and the output transistor 305 is turned on. Consequently, the generator 1 starts to generate power, and the peak value of the phase voltage at point P and hence the potential at the noninverted input of the comparator 111 increases, causing the output of the latter to be switched to the "H" level again. Thus, the generator operation is terminated again.

The phase voltage regulator 11 regulates the peak voltage value at point P of the generator 1 by repeating the above operations such that the peak value of the phase voltage becomes that shown by waveform A in region III. The regulated peak value should be small enough to prevent the generation of a substantial power output, while allowing the detection thereof. Preferably it is set at about one-third the predetermined value given by the voltage regulator 3.

Since, in the present phase voltage regulator, the phase voltage at point P of the generator 1 is detected and, when the voltage exceeds the predetermined value, a field current is supplied to the generator to restart its operation to thereby regulate it to the predetermined value, it is possible to regulate the phase voltage at point P even if the acceleration detector 9 detects an acceleration.

Therefore, it becomes possible to detect the number of revolutions of the generator and to supply the control signal correspondingly during the acceleration of the engine.

In addition thereto, since the peak voltage value at point P is selected to be lower than the battery voltage, the generator 1 does not provide substantial output power during the acceleration of the engine, which otherwise necessitates a substantial torque to be produced by the engine so that the mechanical load of the engine is increased.

What is claimed is:

1. A control device for controlling a vehicle mounted a.c. generator having a plural phase armature winding (101) and a field winding (102) and associated with a fullwave rectifier (2), comprising: a semiconductor voltage regulator (3) responsive to an output voltage of said rectifier for regulating a current flowing through said field winding, said semiconductor voltage regulator having an input transistor circuit (304, 308) and an output transistor circuit (305) connected in series with said field winding, an acceleration detector (9) responsive to a frequency of a voltage at one phase of said armature winding and an output signal of at least one sensor mounted on said vehicle and adapted to sense an acceleration condition of said vehicle for providing an output signal indicative of the acceleration condition and a control signal for controlling said input transistor circuit, and a phase voltage regulator (11) responsive to said voltage at one phase of said armature winding for controlling said input transistor circuit independently of said acceleration detector only when said voltage at one phase of said armature winding is reduced below a predetermined level to thereby increase said voltage at one phase of said armature winding to a level which said acceleration detector can detect.

2. The control device as claimed in claim 1, wherein said phase voltage regulator comprises a constant voltage source (A,112,113) for providing a reference voltage corresponding to said predetermined level, a capacitor (114), a charging circuit (116,115) for charging said capacitor when said phase voltage is above said predetermined level, a discharging circuit (117) for discharign said capacitor when said phase voltage is below said predtermined level, and a comparator (111) having a first input terminal supplied with said reference voltage, a second input terminal connected to said capacitor, and an output terminal connected to a base of said input transistor circuit, said capacitor being operative such that, when a voltage of said capacitor is higher than said reference voltage, it supplies a base current to said input transistor to control said output transistor circuit such that the latter allows a field current to flow through said field winding to thereby increase said phase voltage to an extent to enable said acceleration detector to provide said output signal.

3. The control device as claimed in claim 2, wherein said charging circuit includes a resistor (116) and a reverse current blocking diode (115) connected in series with said resistor, one end of said charging circuit being connected to said one phase of said armature winding and the other end being connected to said capacitor, and said discharging circuit includes a resistor (117) connected in parallel to said capacitor.

* * * * *